US008839623B2

(12) United States Patent
Nakasuka et al.

(10) Patent No.: US 8,839,623 B2
(45) Date of Patent: Sep. 23, 2014

(54) ROTARY HEAT ENGINE

(75) Inventors: Shinichi Nakasuka, Bunkyo-ku (JP); Hironori Sahara, Bunkyo-ku (JP); Kenji Higashi, Yamatotakada (JP)

(73) Assignees: Da Vinci Co., Ltd., Nara (JP); The University of Tokyo, Tokyo (JP)

( * ) Notice: Subject to any disclaimer, the term of this patent is extended or adjusted under 35 U.S.C. 154(b) by 1146 days.

(21) Appl. No.: 12/065,751

(22) PCT Filed: Sep. 5, 2006

(86) PCT No.: PCT/JP2006/317487
§ 371 (c)(1),
(2), (4) Date: Feb. 17, 2009

(87) PCT Pub. No.: WO2007/029662
PCT Pub. Date: Mar. 15, 2007

(65) Prior Publication Data
US 2009/0139227 A1 Jun. 4, 2009

(30) Foreign Application Priority Data
Sep. 6, 2005 (JP) ................................ 2005-257591

(51) Int. Cl.
| | | |
|---|---|---|
| F01K 23/06 | (2006.01) | |
| F01K 25/00 | (2006.01) | |
| F01C 21/06 | (2006.01) | |
| F01C 21/10 | (2006.01) | |
| H02K 7/18 | (2006.01) | |
| F01C 1/22 | (2006.01) | |
| F01K 25/10 | (2006.01) | |
| F02G 1/043 | (2006.01) | |
| F02B 53/00 | (2006.01) | |

(52) U.S. Cl.
CPC ......... *H02K 7/1823* (2013.01); *F02B 2053/005* (2013.01); *F01C 21/06* (2013.01); *F01C 21/10* (2013.01); *F04C 2240/30* (2013.01); *F01C 1/22* (2013.01); *F01K 25/10* (2013.01); *F04C 2210/24* (2013.01); *F02G 1/043* (2013.01); *Y02E 20/14* (2013.01)
USPC .............................................. 60/670; 60/671

(58) Field of Classification Search
USPC .................. 60/508, 514, 516–526, 682, 643, 60/645–681; 415/92
See application file for complete search history.

(56) References Cited

U.S. PATENT DOCUMENTS 3,169,375 A * 2/1965 Velthuis .......................... 60/670
3,292,366 A * 12/1966 Rice et al. ....................... 60/651

(Continued)

FOREIGN PATENT DOCUMENTS

| JP | 54-108148 A | 8/1979 |
|---|---|---|
| JP | 1-200048 A | 8/1989 |

(Continued)

OTHER PUBLICATIONS

Microfilm of the specification and drawings annexed to the request of Japanese Utility Model Application No. 129561/1981 (laid-open No. 36142/1983) (Fuji Photo Film Co., Ltd.), Mar. 9, 1983, Full text; Fig. 3.

*Primary Examiner* — Christopher Jetton
(74) *Attorney, Agent, or Firm* — Millen, White, Zelano & Branigan, P.C.

(57) ABSTRACT

A rotary heat engine having a cylinder and a rotor having a rotating shaft rotatably placed in the cylinder. The cylinder has a heat receiving section for supplying heat to the inside of the cylinder and a heat radiating section for radiating heat from the inside. The engine also has an engine section body and an operation liquid storage section. A vaporized gas supply channel and a gas recovery channel communicating with the inside of the cylinder are provided, respectively, on the heat receiving section side and heat radiating section side of the cylinder in the engine section body. The operation liquid storage section is between the vaporized gas supply channel and the gas collection channel in order to aggregate and liquefy recovered gas and is installed such that both channels fluidly communicate with each other. Also, the operation liquid storage section has a heat insulation dam provided with a through hole for preventing backflow of fluid flowing inside.

6 Claims, 2 Drawing Sheets

(56) References Cited

U.S. PATENT DOCUMENTS

| | | | | |
|---|---|---|---|---|
| 3,737,248 | A | * | 6/1973 | Abraham .................. 415/198.1 |
| 3,774,397 | A | * | 11/1973 | Engdahl ...................... 60/667 |
| 3,958,421 | A | | 5/1976 | Kelly |
| 4,008,573 | A | * | 2/1977 | Petrillo ...................... 60/651 |
| 4,044,559 | A | | 8/1977 | Kelly |
| 4,089,174 | A | * | 5/1978 | Posnansky ................. 60/641.14 |
| 4,357,800 | A | * | 11/1982 | Hecker ...................... 60/519 |
| 5,043,592 | A | * | 8/1991 | Hochstrasser ................. 290/52 |
| 2006/0073050 | A1 | * | 4/2006 | Iwanami et al. ................. 418/3 |

FOREIGN PATENT DOCUMENTS

| | | |
|---|---|---|
| JP | 8-33271 A | 2/1996 |
| JP | 2001-20706 A | 1/2001 |
| JP | 2003-83166 A | 3/2003 |

* cited by examiner

ROTARY HEAT ENGINE

TECHNICAL FIELD

The present invention relates to a heat engine and, more specifically, to a rotary heat engine utilizing temperature differential.

BACKGROUND ART

Stirling engines have been known as an environment-friendly heat engine having a high heat efficiency in theory. Typically the stirling engine has a power piston called "displacer" that reciprocates in a cylinder. Improvements have been made on the stirling engine in recent years including, for example, a diaphragm mechanism.

The stirling engines having a reciprocating displacer need provision for a mechanism for converting the reciprocating movement to the rotational movement of a drive shaft and a fly wheel in order to maintain rotation at a constant speed assisted by inertia. The stirling engines of this type are thus disadvantageous in mechanical efficiencies.

An improved stirling engine is disclosed in JP 2003-83160A having a disc-shaped displacer capable of converting volume changes to rotating movement not to reciprocating movement.

The rotary stirling engines of the above type are advantageous because they are free of power pistons, fly wheels or other components which may adversely affect the mechanical efficiency of the engine. However, they require a large temperature differential to obtain high heat efficiencies since they use a gas as a working fluid.

DISCLOSURE OF THE INVENTION

Accordingly, it is an object of the present invention to provide a rotary heat engine which operates in response to cyclic volume changes of a working fluid even at small temperature differentials.

The above and other objects of present invention may be accomplished by providing a reservoir of the working fluid in the fluid circulating path to enhance the heat recovery and gasifying efficiencies of the working fluid. In addition, as a preferable embodiment, a low boiling-point alcohol is used as working fluid so that a large change in volume is obtained even with a heat input at a relatively low temperature to achieve a high heat efficiency in the stirling cycle.

According one aspect of the present invention, there is provided a rotary heat engine comprising an engine body including a cylinder and a rotor having a shaft rotatable in the cylinder, the cylinder including a heat receiving section for receiving and transmitting external heat to the interior of the cylinder and a heat discharging section for discharging heat from the interior of the cylinder, the cylinder defining an inlet channel adjacent to the heat receiving section for introducing a working fluid into the cylinder and an outlet channel adjacent to the heat discharging section for recovering the working fluid from the cylinder; and a reservoir section for the working fluid connecting said inlet and outlet channels in fluid communication for liquefying the working fluid recovered from the cylinder through said outlet channel and supplying the gasified working fluid to the cylinder through said inlet channel, the reservoir section including dam means for preventing backflow of the working fluid therethrough.

The rotor is generally triangular in shape and preferably housed in the cylinder with a clearance between the cylinder inner wall and each apex ranging 0.01-0.3 mm for smooth rotation and efficient sealing. When the rotational axis of the rotor is moving in the cylinder during rotation, the above clearance may be maintained by taking the moving distance and the radius of rotation of the rotor into account when the engine is designed. Alternatively, each apex of the rotor may be provided with a buffer seal contacting the cylinder inner wall. It is also possible to manufacture the apex portions of the rotor from a material having a density higher than that of the material of the central portion in order to achieve initial rotation of the rotor.

In operation, the gasified working fluid alternates the heat receiving section side (high temperature) and the heat discharging section side (low temperature) to generate a driving force without mechanical loss due to reciprocal movement of a displacer. The rotary engine of the present invention exhibits very high heat efficiencies. This is because there is no mechanical energy loss owing to the reciprocating movement of displacer on the one hand, and the working fluid reservoir serves to enhance heat recovery and gasifying efficiencies of the gas circulating path on the other hand.

In an embodiment, the cylinder wall located between the heat receiving section and the heat discharging section is made, at least in part from a heat insulating material to prevent direct heat transfer between them. Accordingly, the heat receiving section side of the cylinder is mainly occupied by the heated working fluid having a high temperature while the heat discharging section side is mainly occupied by the cooled working fluid having a low temperature. This also contributes to an enhanced heat efficiency.

In a further embodiment, the heat discharging section is formed integrally or in direct contact with the cylinder. The cylinder is bulged in the heat discharging region and provided in this region with a plurality of heat exchange fins which extend radially inwardly a distance between the cylinder inner wall and the rotation path of the rotor apex.

The total heat transfer surface area of the cylinder in the heat discharging region is thus enlarged for heat exchange with the gas confined in this region. This enables to recover the working fluid itself and the condensation heat from the working fluid in the reservoir section through the outlet channel.

In a still further embodiment, the inlet channel for supplying the working fluid to the cylinder include a plurality of capillary tubes or hollow fibers for assisting movement of the working fluid from the reservoir section by the capillary attraction.

In this embodiment, the capillary tubes or fibers placed in the inlet channel of the working fluid serve to enhance the movement and vaporization of the working fluid flowing from the reservoir section to the cylinder interior through the inlet channel. The capillary tubes or fibers are preferably made of a corrosion resistant material such glass.

In a further embodiment, the working fluid is an alcohol having a low boiling point. The working fluid, in this case, easily undergoes phase transfer from a gas phase to a liquid phase even a heat input at a relatively low temperature to afford a large volume change and also to enable recovery of the liquedifying latent heat. This is because the alcoholic working fluid reaches at the boiling point even with a relatively small amount of heat energy. The low boiling point-working fluid in the inlet channel may cause, when re-evaporized by the heat of the heat receiving section, a backflow of the fluid in the reservoir section toward the outlet channel. Therefore, a flow restricting dam defining a flow-through bore having a truncated cone shape made of a heat insulating material is disposed in the reservoir section in order to prevent the backflow of the working fluid.

In a still further embodiment, the rotatable shaft of the rotor may be coupled via a power transmission mechanism to a rotatable shaft of an electrical motor or generator. Thus the rotary heat engine according to this embodiment can convert the applied heat energy to electric energy instead of converting all of the applied heat energy to the mechanical energy for driving the rotatable shaft of the rotor. For instance, a rotary heat engine system exhibiting heat loss at minimum may be provided by coupling the electric generator to the electric motor to feedback the electric energy to the motor.

In the just described embodiment, the power transmission mechanism for coupling the rotatable shaft of the rotor to the output shaft of the electrical generator is preferably comprised of a magnetic coupling system including a pair of magnetically cooperating coupling members. The pair of magnetic coupling members are joined together in non-contacting state for synchronous rotation of their respective rotatable shafts. As opposed to direct coupling of two rotatable shafts, the magnetic coupling allows the magnetic coupling member attached to the rotatable shaft of the rotor of the heat engine to be enclosed within a chamber defined by the cylinder sidewall and thus leakage of the working fluid or gas from the cylinder may be eliminated. This contributes to enhanced reliability and prolonged service life of the engine.

A still further embodiment is directed to an electric power generating system comprising the rotary heat engine of the present invention. In this embodiment, the rotor carries a plurality of permanent magnets on the periphery to generate electric power in cooperation with coils located outside the rotational area of the rotor but within the territory of the magnetic field of said magnets. In this embodiment, the rotary heat engine itself constitutes part of an electric generator and thus the amount of mechanical energy loss may be minimized in the electric power generating system.

The rotary heat engine of the present invention thus utilizes the phase transfer of a working fluid to convert heat energy to a rotor driving force using a minimum number of driving components. Therefore, a heat conversion efficiency as close as the efficiency of ideal stirling cycle may be attained by suitably selecting the working fluid which undergoes phase transfer by applying heat energy at a wide range of temperatures.

The invention will now be described in detail making reference to several embodiments. However, the invention is not limited to these embodiments but various changes can be made without departing from the principle of the present invention.

BEST MODE FOR CARRYING OUT OF THE INVENTION

Figure 1:
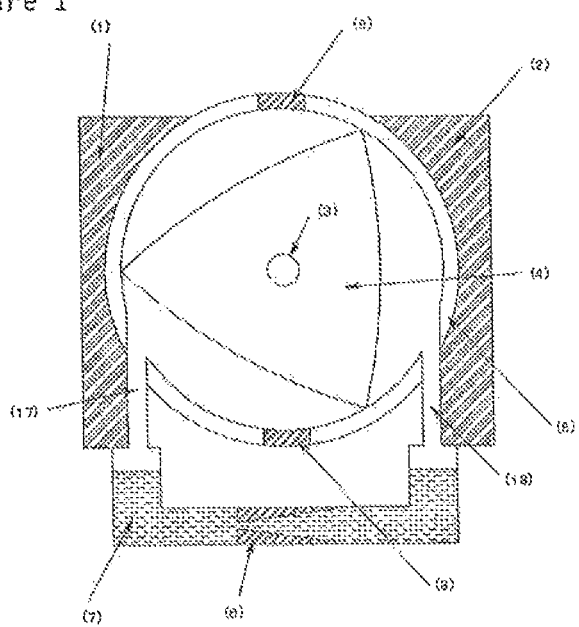
FIG. 1 is an illustrative view of the rotary heat engine according to the first embodiment of the present invention showing schematically part of the internal structure of the engine.

FIG. 1 shows schematically the structure of a rotary heat engine according the first embodiment of the present invention. Referring to FIG. 1, the rotary heat engine comprises a cylinder (5) and a rotor (4) having generally triangular shape rotatably housed within the cylinder. A heat receiving section (1) and a heat discharging section (2) are disposed on the opposite sides of the cylinder integrally with or in thermal contact with the cylinder wall. The cylinder wall is circumferentially interrupted, at least in two zones, by a wall section made of heat insulating material (8) between the heat receiving section side and the heat receiving section side to thermally insulate between them. The rotor (4) is generally trianglar in shape in this embodiment. However, any rotor having other shapes such as a cross shape or having a curved face may also be used provided the rotor defines a plurality of spaces within which the gasified working fluid can be confined.

The engine also comprises a path for cycling the working fluid to rotate the rotor (4). The cycling path is comprised a working fluid flow inlet channel (17) and a working fluid flow outlet channel (18) both in fluid communication with the interior of the cylinder (5), and a reservoir section (7) in fluid communication with the inlet channel (17) and the outlet channel (18).

The reservoir section (7) include a flow restricter dam (6) made of a heat insulating material. The flow restricter dam includes means for preventing backflow of the working fluid toward the outlet channel (18). For example, the flow restricting dam may take in the form of a flow-through bore having a truncated cylindrical shape tapering toward the working fluid outlet channel (18). Other flow restricting means known in the art may also be used provided the backflow of the working fluid heated in the heat receiving section (1) to the heat discharging section is hydraulically prevented. The working fluid to be stored in the reservoir section (7) preferably has a boiling temperature which is 10-50° C. lower than the temperature of the heat receiving section (1).

In this embodiment, the working fluid staying in the reservoir section (7) immediately upstream of the heat receiving section (1) is vaporized and gasified by the heat input from the heat receiving section (1). The gasified working fluid then enters the cylinder (5) through the inlet channel (17) and is allowed to expand to thereby drive the rotor (4) in rotation. The expanded gasified working fluid is then conveyed in the cylinder to the heat discharging section side while being confined by the rotor and liquefied there by cooling. The liquefied working fluid is recovered in the reservoir section (7) via the outlet channel (18). A heat cycle is thus accomplished by the rotary heat engine of the present invention. The inlet channel (17) and the outlet channel (18) for conveying the working fluid to and from the cylinder (5) may take any shape provided they allow a fluid flow by the gravity or pressure.

According to the above-described embodiment, the present invention provides a rotary heat engine which enables conversion of heat energy to mechanical power at a high efficiency with a minimum mechanical energy loss even where only relatively a low temperature heat source and, therefore, a small temperature differential are available. Accordingly, the rotary heat engine of the present invention may find use in the recovery of exhausted waste heat energy which is drawing much social attentions in recent years.

Figure 2:
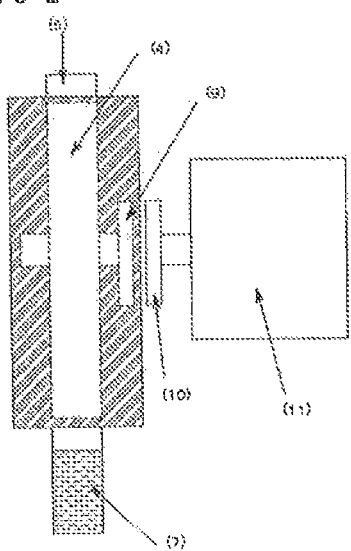
FIG. 2 is an illustrative side view of the heat engine of shown in FIG. 1 coupled to an electric motor or generator according to the second embodiment of the present invention.

FIG. 2 shows in a schematic side view the rotary heat engine of the first embodiment coupled to an electric generator according to the second embodiment of the present invention. In FIG. 2, the same reference numerals identify the same components or parts. That is to say, reference numerals (4), (5) and (7) identify the rotor, the cylinder and the reservoir section, respectively. In this embodiment, the rotating shaft (3) of the rotor (4) carries a magnetic coupling member (9) at one end which is rotatably enclosed within the side wall of the cylinder. An electric generator (11) installed adjacent to the heat engine has an input shaft also carrying a magnetic coupling member (10). The magnetic coupling members (9) and (10) are joined together in non-contact state so that the respective shafts are coupled together in alignment without direct face-to-face contact. The use of a magnetic coupling member enclosed within the cylinder side wall completely eliminates the various problems associated with the leakage of the working fluid. However, the coupling mechanism is not limited to the magnetic coupling but any conventional coupling mechanism may be used as well.

According to the second embodiment of the present invention, an electric generator system having enhanced durability and reliability characteristics may be provided comprising the heat engine according to the present invention and an external electric generator coupled to the rotor shaft of the heat engine by means of the magnetic coupling mechanism disclosed herein. Although an electric generator is used in this embodiment, an electric motor may also be coupled to the heat engine of the present invention. In this case, the motor is preferably powered by the electric generator according to the third embodiment of the present invention which will be described below. A very high energy conversion efficiency is afforded by coupling an electric motor to the heat engine of the present invention.

Figure 3:
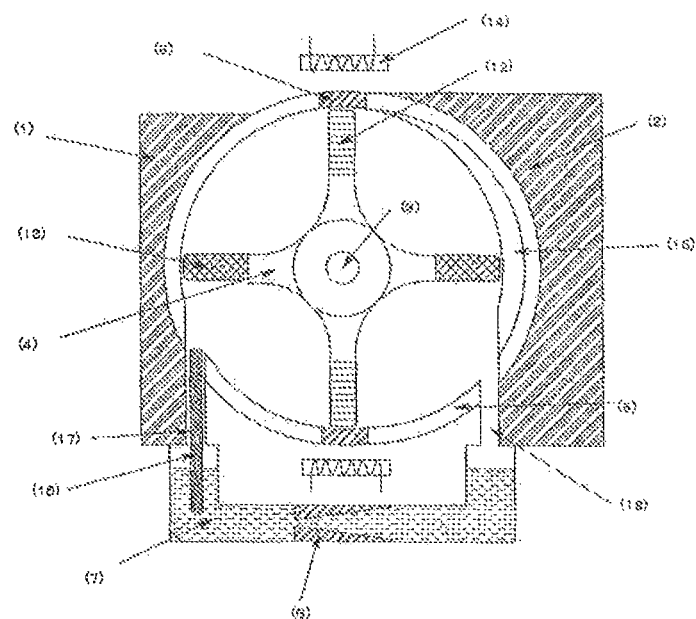
FIG. 3 is an illustrative view of the heat engine according to the third embodiment of the present invention showing schematically part of the internal structure. The engine shown in FIG. 3 includes a cross-shaped rotor and a mechanism for generating electric power.

FIG. 3 shows schematically the third embodiment of the present invention. According to the third embodiment, the working fluid inlet channel (17) adjacent to the heat receiving section (1) includes a number of capillary tubes (16) disposed therein. In this embodiment, the wall of cylinder (5) has a bulged portion in the region of the heat discharging section (2). A plurality of heat exchange fins (15) extend from the cylinder inner wall radially inwardly in the direction of the rotor shaft (3). The rotor (4) in this embodiment assumes a cross in shape and includes angularly equispaced four rotor arms each carrying a permanent magnet (12, 13) at the distal end of the arm. The polarity of four magnets alternates S and N from the adjacent magnet. A pair of electric power generating coils (14) are diametrically disposed in the magnetic field of the magnets (12, 13) arround the periphery of the cylinder as shown. Thus the rotary heat engine according to this embodiment constitutes by itself a electric power generating system. Although a fin is shown as the heat exchange means in this embodiment, other heat exchange means such as a metal mesh screen may be used for enlarging the fluid contacting surface area of the cylinder.

According to the third embodiment of the present invention, the vaporization or gasifying of the working fluid staying in the reservoir section is accelerated with a bundle of capillary tubes (16) by the capillary attraction and the fluid contacting surface area of the cylinder inner wall in the heat discharging region is enlarged for improving the heat exchange efficiency. The above configurations contribute, in combination, to the provision of a rotary heat engine having a very high heat efficiency since a large volume change of the gasified working fluid is achieved even with a heat input stream having a relatively low temperature. Moreover, the electric power generation system including the above rotary heat engine in itself eliminates possible energy loss significantly resulting in a highly efficient electric power generating system. As a result, a nearly ideal stirling cycle may be attained by this embodiment.

Figure 4:
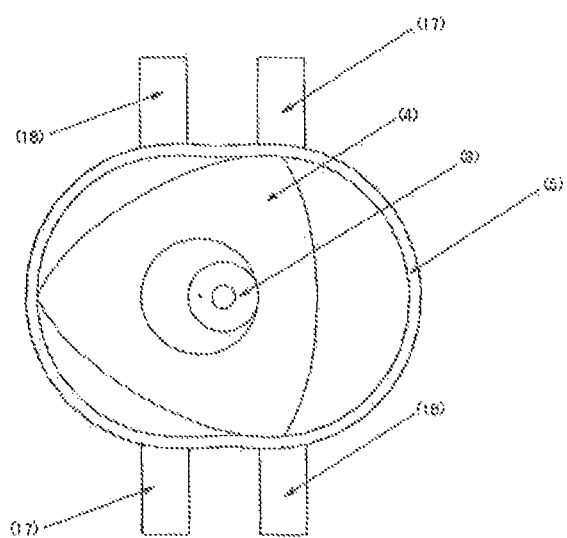
FIG. 4 is an illustrative view of the heat engine according to the fourth embodiment of the present invention showing schematically part of the internal structure. The engine shown in FIG. 4 includes two sets of a gasified working fluid supply path and a gas recovery path.

FIG. 4 is an illustrative view of the rotary heat engine according the fourth embodiment of the present invention showing schematically part of the internal structure of the engine having two sets of the working fluid inlet (17) and outlet (18) for conveying the working fluid to and from the cylinder (5). In this embodiment, the rotor (4) is generally triangular in shape and defines a circular opening concentrically. The periphery edge defining the central opening is toothed internally and the rotational shaft (3) rotatably carried between cylinder side walls is also toothed externally (not shown). The rotation of rotor (4) in the cylinder (5) is thus transmitted to the rotatable shaft (3) by the meshed engagement between the rotor (4) and the shaft (3). The rotary heat engine of this embodiment includes two sets or pairs of the working fluid inlet channel (17) and outlet channel (18) located opposite sides of cylinder. However, the inlet path (17) of the first set is juxtaposed with the outlet path (18) of the second set on the first side of the cylinder and the outlet path (18) of the first set is juxtaposed with the inlet port (17) of the second set on the other side of the cylinder. As a result, the pressure of gasified working fluid is converted to mechanical power in a more efficient manner. The heat receiving section and the heat discharging section (not shown) may be positioned anywhere on the fluid flow path connecting the reservoir section (7) and the cylinder (5) in fluid flow communication. This allows freedom of design of the engine. The gasified working fluid may be supplied, in this embodiment, through one of two inlet channels (17) alternately in synchronism with the rotation of rotor (4).

INDUSTRIAL APPLICABILITY

According to the present invention, a highly efficient co-generation system may be provided by magnetically coupling the rotatable shaft (3) carrying a permanent magnet (9) at one end to a power source, for example, a wind mill. The system functions, in this case, not only as an electric generator but also as a system for heat energy recovering system.

Similarly, when the rotor of the rotary heat engine is driven externally by an electric motor, the rest of recovered heat energy may be converted again to the electric energy. Accordingly, a highly efficient cooling and warming cabinet or box may be constructed using the above principle.

The rotary heat engine of the present invention may be incorporated into an electric power generating system operated by temperature differential even at a relatively low temperature. By virtue of these characteristics, the rotary heat engine of the present invention may find use in co-generation systems and electric power generation systems utilizing waste heat energy exhausted from various plants.

The rotary heat engine of the present invention works even in the environment of space satellites. Therefore, the rotary heat engine of the present invention may find use in the generation of electric power in such environment. However, it will be easily appreciated that the application of the rotary heat engine of the present invention is not limited to those specifically disclosed herein and that the engine may be used in other application field as well.

The invention claimed is:

1. A rotary heat engine comprising:
a cylinder including two sets of an inlet channel for supplying gasified working fluid to the cylinder and an outlet channel for recovering liquefied working fluid from the cylinder, said inlet channel and said outlet channel in each set are located on opposite sides of said cylinder, said inlet channel of the first set is juxtaposed with said outlet channel of said second set on a first side of said cylinder and said outlet channel of said first set is juxtaposed with said inlet channel of said second set on the other side of said cylinder;
a rotor rotatably received within the cylinder and dividing the inside of the cylinder into at least three chambers, wherein said rotor is eccentrically placed; and
a fluid flow path for circulating a working fluid through the cylinder, said fluid flow path including a heat receiving section and a heat discharging section, and
a working liquid reservoir section connecting said inlet and outlet channels in fluid flow communication, said reservoir section including a flow restricting dam for preventing backflow of the working fluid toward said outlet channel.

2. The rotary heat engine according to claim 1 wherein a bundle of capillary tubes extending from said reservoir section is placed in said working fluid inlet channels for assisting to convey the working fluid to the inlet channel by the capillary attraction.

3. The rotary heat engine according to claim 1 wherein said working fluid is selected from low boiling point-alcohols.

4. The rotary heat engine according to claim 1 wherein said rotatable shaft is coupled to an output shaft of an electric motor or an input shaft of an electric generator via power transmission means.

5. The rotary heat engine according to claim 4 wherein said power transmission means comprises an input coupling member and an output coupling member each made of a permanent magnet having an opposite polarity capable of joining together face-to-face without direct contact for synchronous rotation.

6. The rotary heat engine according to claim 1 wherein said rotor carries a plurality of permanent magnets disposed at or close to the circumference of the rotor and wherein a plurality of electric power generating coils are disposed around the rotor periphery within the territory of the magnetic field of said plurality of permanent magnets.

* * * * *